United States Patent [19]
Jackson

[11] 3,744,838
[45] July 10, 1973

[54] FRICTION CLAMP

[76] Inventor: Robert Alvin Jackson, 6565 Aubrey St., Burnaby, British Columbia, Canada

[22] Filed: Jan. 28, 1972

[21] Appl. No.: 222,066

[52] U.S. Cl.................... 294/116, 294/94, 29/267
[51] Int. Cl................................................. B25b 5/08
[58] Field of Search...................... 294/94, 95, 102, 294/106, 116; 24/134 R, 134 E, 134 L, 134 M, 134 P, 134 CP, 248 E; 29/238, 258, 261, 262, 267

[56] References Cited
UNITED STATES PATENTS
| | | | |
|---|---|---|---|
| 2,560,929 | 7/1951 | Calbeck | 29/238 |
| 68,304 | 8/1867 | Morse | 24/134 E |
| R16,646 | 5/1927 | Mitchell | 294/116 X |

FOREIGN PATENTS OR APPLICATIONS
624,174   12/1935   Germany ........................... 294/116

Primary Examiner—Evon C. Blunk
Assistant Examiner—Johnny D. Cherry
Attorney—Kellard A. Carter

[57] ABSTRACT

A clamp formed from two identical clamp members interconnected by an adjustable bolt which passes through them. The clamp is actuated by a pair of rotary cams journalled in cylindrical recesses in opposed faces of the clamp members, the cams having convex interengaging cam faces so that when rotated together in contact they spread the clamp members at one end of the clamp and thereby close the ends at the other end of the clamp. This arrangement is of particular value in the repair of automobile bodies which have been damaged, since a sheet of metal can be engaged either at the end or at the side of the clamp, or the clamp members may be located one on each side of a sheet of metal and bolted together through the sheet.

In a variant, adjustable jaws are provided on the clamp to facilitate the lifting of blocks of material of varying widths.

9 Claims, 7 Drawing Figures

PATENTED JUL 10 1973 3,744,838
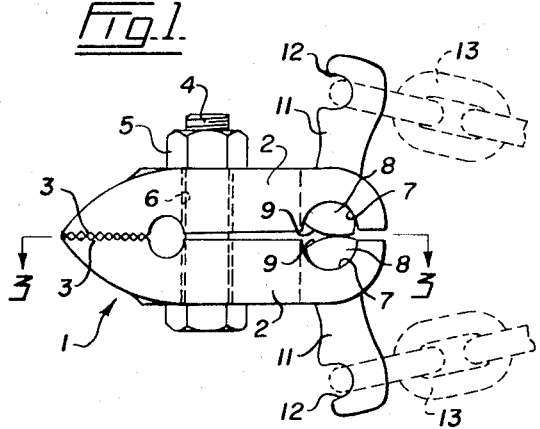
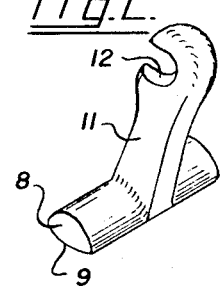
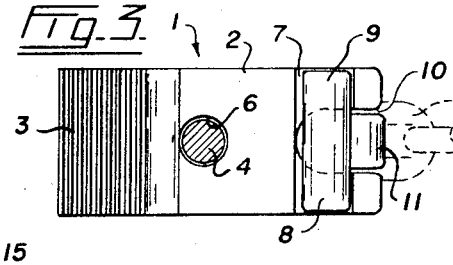
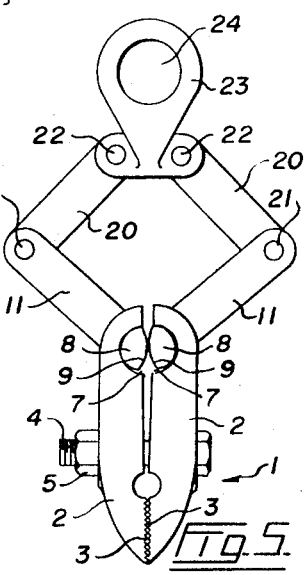
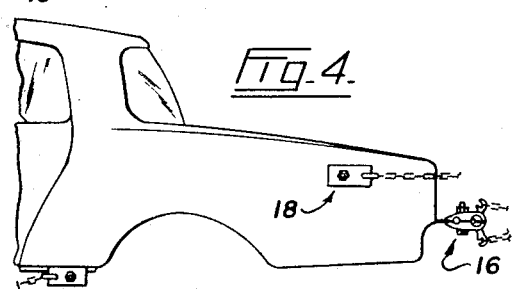
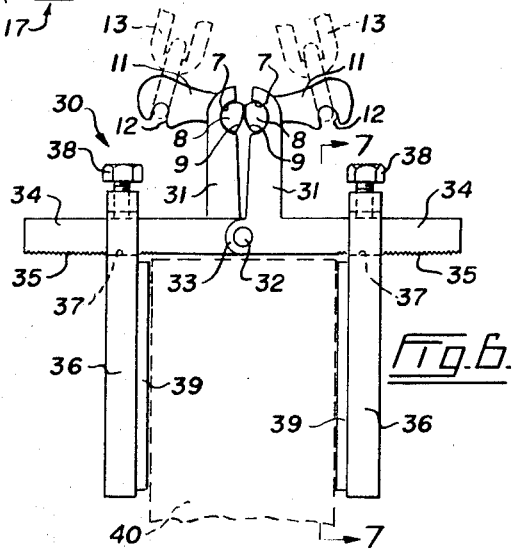
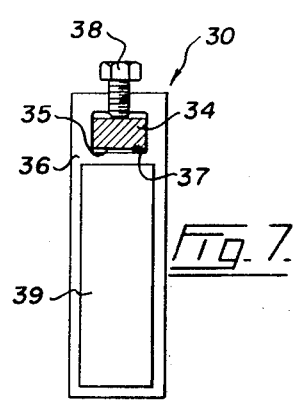

FRICTION CLAMP

The invention relates to clamps of the kind utilizing camming means for applying clamping pressure and particularly to such clamps for use in the repair of body work of road vehicles.

Clamps utilizing a camming action to operate them are known, two examples being disclosed in U.S. Pat. No. 2,383,078 to Pringle and No. 3,318,630 to Bryant. In such earlier constructions, as exemplified by Pringle and Bryant however, the clamp is only capable of use in providing an end pull since the only surfaces capable of clamping action are those of the actual jaws themselves. The unit construction used in the manufacture of modern automobiles is of a nature which necessitates the application of clamps in a manner other than to provide a direct end pull when repair work is being carried out. The earlier clamps discussed above are inappropriate for such work.

It is among the objects of the present invention to provide a clamp which is versatile in use and which can be used in various ways as will be described below in the repair of automobile bodies.

The invention therefore provides a clamp comprising a pair of clamp members presenting opposed clamping jaws at one end of the clamp and opposed journal means for rotatable cams at the other end of the clamp, means providing a fulcrum between the jaws and journal means for each of said clamp members, and opposed cams journalled in said journal means, said cams having interengaging convex cam faces for causing a spreading movement of said other ends of said clamping members when rotated from an inoperative position.

The invention will now be described by way of example with reference to the accompanying drawing in which;

FIG. 1 is a plan view on a clamp according to the invention,

FIG. 2 is a perspective view of one of the cams forming part of the construction of FIG. 1, FIG. 3 is a section on the line 3—3 of FIG. 1, FIG. 4 is an elevation of part of a vehicle body showing three modes of use of the clamp according to the invention, FIG. 5 is a plan view of a modified embodiment of the invention, FIG. 6 is a plan view of a third embodiment of the invention, and FIG. 7 is a sectional elevation on the line 7—7 of FIG. 6.

Referring first to FIGS. 1 to 3 of the drawings, the clamp 1 shown comprises two identical members 2 having serrated jaws 3 at one end and interconnected by a bolt 4 upon which a nut 5 is engaged for adjustment. The bolt 4 passes through bores 6 in the members 2.

At the ends of the members 2 remote from the jaws 3, the members 2 are provided with semi-cylindrical opposed recesses 7 forming journals for a pair of rotary cams 8. The cams 8 have cylindrical surface portions engaging the recesses 7 and convex interengaging cam faces 9. As best seen in FIG. 3, the ends of the members 2 remote from the jaws 3 are bifurcated at 10, the bifurcation 10 intersecting the recesses 7 at right angles thereto. Each of the cam members 8 has an operating lever 11 extending from the mid point thereof outwardly through the bifurcation 10 in the corresponding clamp member. A notch 12 is provided in the end of each of the levers 11 to facilitate engagement with a member such as chain 13 for applying leverage.

In use, the bolt and nut 4 and 5 are first adjusted to facilitate engagement of the clamping members 2 over the element to be clamped. After such engagement has been effected, leverage is applied to the levers 11 so as to rock the cams 8 simultaneously. This effects a spreading movement of the ends of the members 2 remote from the jaws 3 so that a clamping action is effected. During this movement, the inner faces of the bolt head and the nut 5 act as fulcrums for the members 2.

Referring now to FIG. 4, a vehicle body 15 is shown to which has been attached three clamps of the kind described above with reference to FIGS. 1 to 3. Clamp 16 has been attached to an edge strip on the vehicle body by means of the jaws 3 so as to provide an end pull. Clamp 17 has been applied so as to engage an edge strip of the vehicle body between the sides of the clamp. With this arrangement, the edge strip of the vehicle body is engaged not only between the jaws 3 but also between the faces 9 of the cams 8. This arrangement facilitates a pull generally parallel with the element which is being gripped. The clamp 18 shown in FIG. 4 has been attached to a body work portion remote from the edge strips. To facilitate such attachment, the clamp is dismantled and reassembled with one of the clamp members 2 on each side of the sheet to be clamped and resecured by the bolt which passes through the clamp members and also through an aperture formed in the sheet.

It will be seen that the clamp of the invention is versatile in use and is capable of practical application in ways not possible with earlier cam action clamps such as those of Pringle and Bryant.

FIG. 5 shows a second embodiment which is generally similar to that of FIGS. 1 to 3 and similar parts are referred to by the same reference numeral. In the case of FIG. 5 however the notches 12 are omitted from the operating levers 11. In this embodiment, a pair of secondary operating levers 20 are each pivoted at one end 21 to the end of the levers 11, the other ends of the levers 20 are pivoted at 22 to a common link 23. The link 23 has an eye 24 to facilitate the application of a pushing or pulling action. It will be seen that such action will rotate the cams 8 through the linkage 20 and 11 to result in the clamp 1 applying a clamping action.

FIGS. 6 and 7 show a third embodiment of clamp 30 in which a pair of clamping members 31 are pivoted together at 32 through overlapping trunnions 33. The members 31 have oppositely projecting perpendicular extensions 34 which are provided with a frictional engaging surface 35 on one side. The surface 35 may be grooved or otherwise roughened as desired. Engaged over the extensions 34 are a pair of adjustable jaw members 36, each of which is apertured at 37 for reception of an extension 34. A bolt 38 extends in threaded engagement with an aperture in the jaw member 36 so as to project into the aperture 37 for locking engagement with the extension 34 as best seen in FIG. 7. The inner faces of the jaw members 36 have a hard rubber pad 39 bonded thereto to provide friction on engagement with the article 40 to be gripped.

The other ends of the clamp members 31 are provided with semi-cylindrical recesses 7, rotary cams 8 and operating levers 11 which are identical in construction and assembly with those shown in FIG. 1 and will not be referred to further.

When using the clamp of FIGS. 6 and 7, the bolts 38 are first loosened and the jaws 36 adjusted in spacing so as to accommodate the article 40 to be lifted after which the bolts 38 are again tightened. Simultaneous leverage is then applied to the levers 11 in the same manner as in FIG. 1 so that the ends of the members 31 remote from the jaws 39 are spread outwardly. This effects a clamping action by the pads 39 on the article 40 which can then be lifted.

It will be seen that the invention provides a clamping mechanism relying on the spreading action of a pair of rotary cams which is versatile in use and application. It will be appreciated that other fields of use are appropriate for the invention. For example, the camming device could readily be applied as a mechanism to actuate a disc brake caliber.

I claim:

1. A clamp comprising a pair of clamp members presenting opposed clamping jaws at one end of the clamp and opposed part cylindrical recesses forming journal means for rotatable cams at the other end of the clamp, means providing a fulcrum between the jaws and recesses for each of said clamp members, and opposed rotatable cams having part cylindrical bearing surfaces received in said recesses, said cams having interengaging convex cam faces for causing a spreading movement of said other ends of said clamping members when rotated in said recesses from an inoperative position.

2. A clamp as claimed in claim 1, wherein said clamp members are formed with substantially flat opposed surfaces and wherein said means providing a fulcrum comprises an adjustable bolt extending through said clamp members, whereby said flat opposed surfaces can be brought substantially into mutual contact.

3. A clamp as claimed in claim 1, wherein said clamp members are bifurcated at said other ends in a direction at right angles to said part cylindrical recesses, and wherein said cams each further comprise an operating lever extending from said cylindrical bearing surface.

4. A clamp as claimed in claim 3, wherein said operating levers are each notched at their ends for engagement with means to apply leverage.

5. A clamp as claimed in claim 3 and further comprising a pair of secondary operating levers pivoted one to each of said first mentioned levers and a common link to which each of said secondary levers is pivoted for causing simultaneous equal rotation of said cams through said first mentioned and secondary levers.

6. A clamp as claimed in claim 1, wherein said clamp members comprise oppositely extending perpendicular extensions at said one end of the clamp, and a pair of jaw members adjustably mounted on said extensions.

7. A clamp as claimed in claim 6, wherein said jaw members comprise a pair of longitudinal elements apertured for engagement over said extensions, a pair of locking bolts extending through said element walls for engagement with said extensions.

8. A clamp as claimed in claim 7, wherein said jaw members further comprise friction pads bonded to their opposed surfaces.

9. Means for effecting a controlled spreading movement between two opposed members, comprising opposed part cylindrical recesses forming cam journal means provided on said members, opposed rotatable cams having part cylindrical bearing surfaces received in said recesses, said cams having interengaging convex cam faces, and means for causing rotation of said cams in said recesses to effect said spreading movement.

* * * * *